United States Patent [19]

Shum et al.

[11] 4,213,160
[45] Jul. 15, 1980

[54] METHODS AND APPARATUS FOR DRIVING INFORMATION CARRIER TAPE

[75] Inventors: Edward K. Shum, Villa Park; Henry M. Martija, La Verne; Leon E. Head, West Covina, all of Calif.

[73] Assignee: Bell & Howell Company, Chicago, Ill.

[21] Appl. No.: 935,189

[22] Filed: Aug. 21, 1978

[51] Int. Cl.² ............................................. G11B 19/28
[52] U.S. Cl. ....................................... 360/73; 360/71; 360/90
[58] Field of Search ........................ 360/73, 71, 69, 90; 226/188; 242/206, 209

[56] References Cited

U.S. PATENT DOCUMENTS

| | | | |
|---|---|---|---|
| 2,757,242 | 7/1956 | Ranger | 360/90 |
| 3,123,811 | 3/1964 | Mutziger | 360/90 |
| 3,189,291 | 6/1965 | Welsh | 360/90 X |
| 3,586,222 | 6/1971 | Rosen | 226/188 X |
| 3,772,468 | 11/1973 | Tatsuguchi | 360/73 |
| 3,808,360 | 4/1974 | Tatsuguchi | 360/73 |
| 3,861,573 | 1/1975 | Kawasaki et al. | 242/209 X |
| 3,912,196 | 10/1975 | Kreutze et al. | 242/206 X |

Primary Examiner—John H. Wolff
Attorney, Agent, or Firm—Benoit Law Corporation

[57] ABSTRACT

Methods and apparatus for driving an information carrier tape use spaced distinct first and second capstans for arranging the tape in a U-shaped tape path having a pair of leg portions spaced from each other by the first capstan and extending to the second capstan and having a bight portion formed by the second capstan and interconnecting the leg portions. In one type of embodiments, the tape is driven with the first capstan and the tape is also driven with the second capstan independently of the first capstan. In another line of embodiments, one of the first and second capstans is electrically slaved to the other capstan.

44 Claims, 2 Drawing Figures

METHODS AND APPARATUS FOR DRIVING INFORMATION CARRIER TAPE

BACKGROUND OF THE INVENTION

1. Field of the Invention

The subject invention relates to information recording and reproduction and, more specifically, to methods and apparatus for driving information carrier tape, such as magnetic recording tape, and to tape transports.

2. Prior-Art Statement

The last two decades have seen unprecedented advances in the information recording and reproduction arts, and particularly in magnetic tape recording and playback.

Yet even in the most advanced prior-art tape recording systems, the tape itself has remained a troublesome and largely intractable component. In particular, the tape, such as used in magnetic tape recorders, is a compliant medium with numerous variables. For instance, the tape has a high modulus of elasticity and a thin base that will easily stretch under tension. In the manner of a transmission line with uniform distribution of mass and compliance, a recording tape is subject to various resonance effects. These include longitudinal resonance in a free tape span, transverse or low frequency resonance and a host of other resonance disturbances stemming from the fact that short spans of wider tapes in instrumentation recorders and other high-grade equipment act in effect as membranes with free edges, provoking a multitude of elusive vibration modes.

In practice, these vibration and resonance effects cause flutter which impairs not only the recording process and the resulting recording, but degrades also the reproduction of recordings.

Another troublesome source of flutter is the stickslip friction which causes the tape to move with a jerky motion at very low speeds, where the static coefficient of friction is larger than the dynamic coefficient at capstans, heads and possible other tape-transport interfaces and which in effect initiates or plucks resonance effects.

Further tension variation and similar disturbance effects are in a tape transport caused by such factors as changes in rotational speed of the tape drive, periodic variations from eccentric drive components, mechanical resonances in shafts, mechanical resonances in head mounts, tension disturbances from the tape reel system and external vibrations. In consequence, the use of servo systems, aiming primarily at a reduction of a ratio of flutter to circular frequency called "time base error," has become routine in instrumentation tape recorders, video tape recorders and other high-grade recording/playback machines.

Parallel to this effort has been the emergence of a dual capstan system in which recording, playback and erasing heads engage the tape at a free span between two spaced capstans. Each capstan has a pinch roller associated therewith which, in the nip or contact area between the pinch roller and capstan shaft, clamps the tape for the transfer of motive power thereto.

One of the capstans thereby acts as supply capstan, while the other operates as takeup capstan. In bidirectional drives, the two capstans alternate in these roles.

Unfortunately, true tape speed in a pinch roller system is not equal to the surface speed of the capstan, since pinch rollers typically are of a compliant kind, being applied to the tape at the capstan with a sufficient amount of pressure to provide the requisite friction at the nip for the desired tape advance. In particular, the pinch roller pressure causes an indentation in the compliant pinch roller whereby the effective radius of the roller is reduced, causing the tape to experience a speed variation as between its entry and exit from the nip. As a result, the tape speed is practically determined by the pinch roller, rather than by the capstan. In addition, pinch rollers add considerable inertia to capstan servo systems, thus impeding servo bandwidth, and are a frequent source of trouble in terms of difficulty of alignment, exposure to dust and other contaminants and subjection to bearing fatigue and other durability limiting factors.

These negative aspects have led to the development of a pure friction drive known as "capstan wrapping" wherein the tape extends around part of the capstan at a sufficient wrap angle to generate the requisite drag force on the tape.

Various systems for achieving the requisite wrap angle have existed. For instance, two spaced idler rollers have been employed to arrange the tape in a U-shaped tape path, with a single capstan being located at and forming the bight portion of the tape. In principle, such an arrangement permits the recording and playback heads to be distributed over both legs of the U-shaped tape path. In practice, however, this advantage is rendered largely illusory by the fact that the rotating capstan tends to create a larger tape tension in the upstream leg of the tape path than in the downstream leg.

The same observation practically applies to a variation wherein a dampened idler is situated between, and in contact with, both legs of the U-shaped tape path. In this respect it may be generally noted that dampened idlers, while addressing themselves to a natural desire to reduce flutter generating tape vibration, exact the often exorbitant price of servo bandwidth reduction.

A somewhat more promising approach evolved from the positioning of an idler roller at the bight portion and the location of the capstan at a distance from such idler between the leg portions of the U-shaped tape path.

In an effort to improve requisite tape tension magnitude and equality in that type of closed loop system, the uniform diameter capstan was replaced by a dual diameter capstan between the leg portions of the tape path, with a smaller ingoing diameter engaging one or more portions of the tape, such as the tape edges, in one leg and a larger outgoing diameter contacting at least one portion of the tape, such as the tape center, in the other leg of the tape path.

Ideally, this method would have allowed reel tensions to be dimensioned optimally in terms of the tape pack. In practice, however, such an approach engenders differential tape tensions across the tape and practically requires a dampening of the idler roller at the bight portion of the U-shaped tape path. Even after such modification, the dual diameter capstan system was limited in its use to unidirectional tape drives or then depended on the use of pinch rollers to press different tape portions against the different diameter capstan portions for different directions of tape advance.

In a modified closed loop approach, the idler at the bight portion of the U-shaped tape path was replaced by an active roller slaved to the motor-driven capstan between the tape legs by a drive belt. In a sense, there were thus two capstans in the tape loop driven by one capstan motor with the aid of a drive belt interconnecting the two capstans.

In practice, such a system has an inherent double-ended limitation. If the drive belt coupling the two capstans is made pliable in the nature of a rubber band, resulting speed fluctuations between the two capstans severely limit servo bandwidth of the system. On the other hand, if the drive belt is made of stiff material, it introduces a self-resonance which relegates attainable servo bandwidths to regions below the particular self-resonance.

SUMMARY OF THE INVENTION

It is a broad object of the subject invention to materially alleviate and ideally overcome the above mentioned and other drawbacks of prior-art systems.

It is a germane object of this invention to improve the quality and performance of information recording and reproduction.

It is a related object of this invention to provide improved information carrier tape transports and transport performance.

It is also a related object of this invention to provide improved methods and apparatus for driving an information carrier tape.

Other objects of this invention will become apparent in the further course of this disclosure.

From a first aspect thereof, the subject invention resides in a method of driving an information carrier tape with spaced distinct first and second capstans relative to information transducing means situated at the space between these capstans. The invention, according to this aspect, resides, more specifically, in the improvement comprising in combination the steps of arranging the tape with the capstans in a U-shaped tape path having a pair of leg portions spaced from each other by the first capstan and extending to the second capstan and having a bight portion formed by the second capstan and interconnecting the leg portions, driving the tape with the first capstan, and driving the tape with the second capstan independently of the first capstan.

From another aspect thereof, the subject invention resides in a method of driving an information carrier tape with spaced distinct first and second capstans relative to information transducing means situated at the space between these capstans. The invention according to this aspect resides, more specifically, in the improvement comprising in combination the steps of arranging the tape with the capstans in a U-shaped tape path having a pair of leg portions spaced from each other by the first capstan and extending to the second capstan and having a bight portion formed by the second capstan and interconnecting the leg portions, driving the tape with the first capstan, driving the tape with the second capstan, and electrically slaving the driving of one of the first and second capstans to the other of the first and second capstans.

From another aspect thereof, the subject invention resides in apparatus for driving an information carrier tape and, more specifically, resides in the improvement comprising, in combination, means for arranging the tape in a U-shaped tape path, including a first capstan located between two leg portions of the tape path, and a second capstan spaced from the first capstan and forming a bight portion for the tape path interconnecting the leg portions, means coupled to the first capstan for driving the tape with the first capstan, and means coupled to the second capstan for driving the tape with the second capstan independently of the first capstan.

From another aspect thereof, the subject invention resides in apparatus for driving an information carrier tape and, more specifically, resides in the improvement comprising, in combination, means for arranging the tape in a U-shaped tape path, including a first capstan located between two leg portions of the tape path, and a second capstan spaced from the first capstan and forming a bight portion for the tape path interconnecting the leg portions, means coupled to the first capstan for driving the tape with the first capstan, means coupled to the second capstan for driving the tape with the second capstan, and electrical signal generating and processing means connected to the means for driving one of the first and second capstans and coupled to the other of the first and second capstans for electrically slaving the means for driving the one capstan to the other capstan.

BRIEF DESCRIPTION OF THE DRAWINGS

The subject invention and its various objects and aspects will become more readily apparent from the following detailed description of preferred embodiments thereof, illustrated by way of example in the accompanying drawings in which like reference numerals designate like or functionally equivalent parts, and in which.

DESCRIPTION OF PREFERRED EMBODIMENTS

Figure 1:
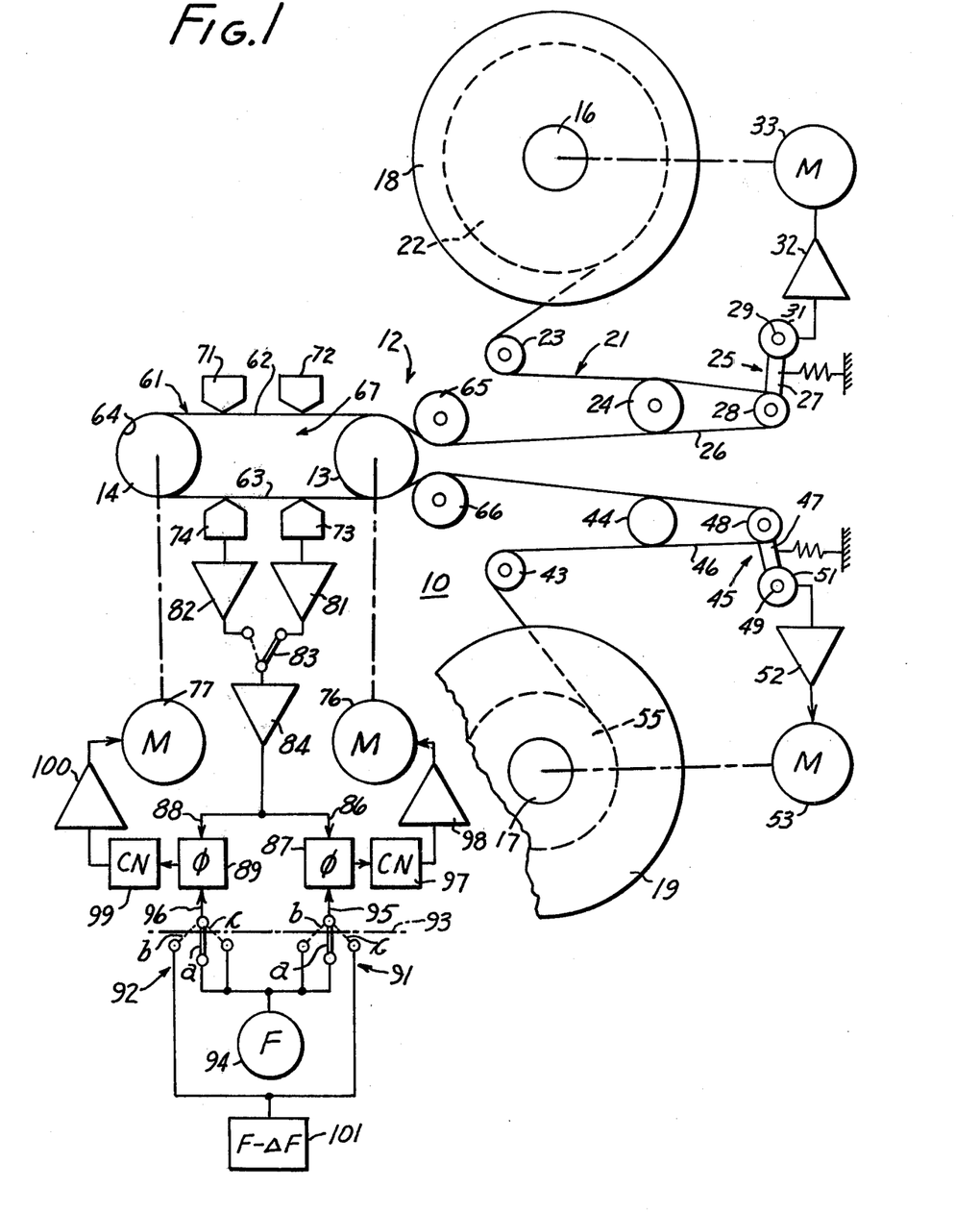
FIG. 1 is a schematic and diagrammatic showing of a closed loop dual capstan magnetic tape drive system in accordance with a preferred embodiment of the subject invention.

The information carrier tape system 10 of the preferred embodiment of the subject invention shown in FIG. 1 has a tape transport 12 equipped with distinct first and second tape drive capstans 13 and 14. In this respect, it may be noted that the numerals "first" and "second" as to the capstans 13 and 14 are not here intended to denote any sequence of importance or control, but rather are thought of as neutral adjectives serving the purpose of proper distinction between the two separate capstans.

The system of FIG. 1 also includes separate hold-down structures 16 and 17 for mounting the hubs of tape reels 18 and 19, respectively. Of course, an indication of flanged reels 18 and 19 does not within the broad contemplation of the subject invention preclude the use of flange-less tape drive systems and transports.

The information carrier tape 21 extends from a tape supply 22 on reel 18 via an idler roller 23 and one side of a loop former idler roller 24 to a first tape tension sensor 25.

The sensor 25 in effect senses the size of the tape loop 26 with the aid of a spring biased sensor arm 27 which carries a tape engaging idler 28 at a free end thereof and is pivoted for angular movement at 29. The angular position of the sensor arm 27 as dictated by the size of the tape loop 26 between idlers 24 and 28 is translated into a corresponding electrical signal generated by a potentiometer or similar position sensing device 31 and amplified at 32 for a control of a reel drive motor 33.

In accordance with conventional practice, the motor 33, under the control of tape tension sensor 25, drives or brakes the reel 18 so as to establish and maintain the most favorable tape supply tension or, in bidirectional operation, the best takeup tension in forming a tape pack on the reel 18.

Since the parts so far described as to the tape reel 18 are in effect duplicated as to the tape reel 19, such duplicated components have been designated in FIG. 1 by a reference numeral which is higher by an addend of 20 than the reference numeral of its counterpart pertaining to the reel 18. Accordingly, the parts or components 43, 44, 45, 46, 47, 48, 49, 51, 52 and 53 correspond to the components 23, 24, 25, 26, 27, 28, 29, 31, 32 and 33, respectively, and serve a controlled drive and braking of the tape 21 on the reel 19 for the formation of a well-formed tape pack 55 when the reel 19 serves as takeup reel and for a controlled unwinding of tape when the reel 19 serves as supply reel in the illustrated bidirectional tape drive. In the system of FIG. 1, the rollers 28 and 48 are rotatably mounted on the tension sensing arm 27 and 47, being angularly movable therewith. The roller 23, 24, 43 and 44, on the other hand, are rotatably mounted on a baseplate, being translatorily stationary relative thereto. Any or all of these rollers may, if desired, be replaced by suitable guides, such as air bearing guides. Also, the rollers 28 and 48 may be replaced by simple pins that are perpendicularly attached to the tension sensing arms 27 and 47.

According to the subject invention, the first and second capstans 13 and 14 arrange the tape 21 in a U-shaped tape path 61 having a pair of leg portions 62 and 63 spaced from each other by the first capstan 13 and having a bight portion 64 formed by the second capstan 14 and interconnecting the leg portions 62 and 63. A pair of idler rollers 65 and 66 is located at the input and output side of the first capstan 13 in order to apply the tape 21 at sufficient wrap angles to the first capstan 13. To this end, the idler rollers 65 and 66 are spaced at a lesser distance from each other than the diameter of the first capstan 13 and the spacing between the leg portions 62 snd 63 of the tape loop.

In this manner, the capstans 13 and 14 independently are in driving engagement with the tape 21 for moving the tape relative to information transducing means situated at the space 67 between the first and second capstans 13 and 14.

The guides 65 and 66 may be idler rollers rotatably mounted on a baseplate, or tape guides, such as air guides, attached to such baseplate.

The nature and operation of the information transducing means depend on the nature of the information carrier tape. By way of example, and in the case of magnetic recording tape, the information transducing means include magnetic recording, playback and erasing heads.

By way of example, a pair of multi-track recording heads is shown in FIG. 1 at 71 and 72, illustrating engagement of the tape in the leg portion 62 by the recording head stacks.

Similarly, multi-track playback heads corresponding to the recording heads 71 and 72 are illustrated at 73 and 74 as being engaged by the tape 21 at the leg portion 63 of the U-shaped tape path. In other words, the capstans 13 and 14 drive the tape 21 past the recording and playback heads 71 to 74 in transducing engagement therewith. If desired, the recording head stacks 71 and 72 and the playback head stacks 73 and 74 may be distributed among the tape loop 61 in a manner other than as illustrated in FIG. 1. For instance, one recording head stack 72 could engage the tape at the leg portion 63, and a playback head stack could engage the tape at the leg portion 62.

As seen in FIG. 1, a first capstan drive motor 76 is coupled to the first capstan 13 for driving the tape 21 with the first capstan 13. Similarly, a second capstan driver motor 77 is coupled to the second capstan 14 for driving the tape 21 with that second capstan independently of the first capstan 13.

In particular, in the system of FIG. 1, the first capstan drive motor 76 rotates the first capstan 13 and thereby drives the tape 21 independently of the second capstan 14 and second capstan drive motor 77. Similarly, the second capstan drive motor 77 rotates the second capstan 14 and thereby drives the tape 21 in the closed loop 61 independently of the first capstan 13 and first capstan drive motor 76. Such independent capstan drives stand in sharp contrast to prior-art systems in whch one capstan was coupled to the other by a drive belt and both capstans were thus driven by the same capstan drive motor.

The subject invention thus avoids the above mentioned bandwidth limitation of belt-coupled dual capstan systems, wherein a compliant belt would introduce speed fluctuations and damping, whereas a stiff belt would introduce its self-resonance into the servo system.

In practice, and as illustrated in FIG. 1, the same reference signal may be employed for controlling both capstan motors 76 and 77, without impairment of the principle according to which the second capstan motor 77 drives the tape 21 with the second capstan 14 independently of the first capstan 13.

In particular, the reference signal in question may be a pilot tone or clock signal recorded on the tape 21 simultaneously with the recording of information or data. In this respect, the symbols 71 and 72 in the drawings should be broadly viewed as representing means for recording information or data and reference or clock signals, even though no separate boxes are shown for the conventional recording amplifiers and similar equipment. Also, the recording heads themselves at 71 and 72 should be viewed as multi-track recording heads, including at least one head per stack for recording reference or clock signals in specific reference tracks on the tape for subsequent time base error correction and other control of the playback process. The recording of reference signals is dealt with more fully below in connection with FIG. 2.

The symbols 73 and 74 shown in the drawings should be broadly viewed as representing playback equipment for reproducing recorded information, data and reference signals from the tape 21, even though the conventional playback amplifiers and related equipment have not been separately shown. In similarity to the recording heads at 71 and 72, the playback heads at 73 and 74 should be viewed as head stacks for reproducing information or data from several parallel tracks on the tape and for simultaneously reproducing reference signals from special reference tracks on the tape 21. In some prior-art systems, a reference signal or clock track was printed or otherwise permanently provided on the tape, and it is within the broad contemplation of the subject invention to operate the servo systems herein disclosed with such permanently provided reference signals or data. Similarly, it is within the broad contemplation of the subject invention to employ pilot tones and other reference or synchronization signals that are combined with the recorded information signals and are extracted or separated therefrom during playback.

The playback heads at 73 and 74 reproduce the reference signals from their corresponding reference tracks on the tape 21 for amplification by preamplifiers 81 and 82, respectively. The respective outputs of preamplifiers 81 and 82 are applied to different poles of a double-throw switch 83.

The switch 83 has a solidly illustrated first position in which applies the reference signal reproduced at 73 and preamplified at 81 for further amplification to an amplifier 84.

The switch 83 also has an alternative second position, illustrated by a dotted line, in which it applies a reference signal reproduced at 74 and preamplified at 82 for further amplification to an amplifier 84.

Either fully amplified reference signal is applied to the first input 86 of a phase detector 87 and to a first input 88 of a phase detector 89.

The illustrated system further includes two switches 91 and 92 each having three positions a, b and c, and both being ganged to each other as indicated by the phantom line 93.

The illustrated system also includes a local oscillator 94 which generates a first fixed reference or clock signal, which is herein referred to as "first local oscillator signal," in contradistinction to the above mentioned reference signals played back from the tape 21. With the switches 91 and 92 in their solidly illustrated positions a, the first local oscillator signal generated at 94 is applied to respective second inputs 95 and 96 of the phase detectors 87 and 89.

As a result of a phase comparison between the played-back reference signal and the local oscillator signal, the phase detector 87 applies an error signal via a compensation network 97 to a capstan drive control amplifier 98 which controls the first capstan drive motor 76 in response to such error signal and thus in effect with the reference signal derived from the tape 21.

Similarly, the phase detector 89, as a result of a phase comparison between the played-back reference signal and local oscillator signal, applies an error signal via a compensation network 99 to a capstan drive motor control amplifier 100 which controls the second capstan drive motor 77 in response to the latter error signal and thus in effect with the reference signal derived from the tape 21.

The phase detector 87, compensation network 97 and motor control amplifier 98 in effect phase lock the first capstan drive motor 76 to the local oscillator signal used at 94 and derived reference signal played back at 73. These components thus form part of a first servo loop which extends through the coupling of the first capstan drive motor to the first capstan 13 and through the tape 21 from the first capstan to the playback head at 73 and amplifiers at 81 and 84 or playback head 74 and amplifiers 82 and 84, depending on the position of the switch 83.

Similarly, the phase detector 89, compensating network 99 and motor control amplifier 100 in effect phase lock the second capstan drive motor 77 to the local oscillator signal produced at 94 and played back reference signal derived at 74 from the tape 12. These components form part of a second servo loop which further extends through the coupling of the second capstan drive motor 77 to the second capstan 14 and from such second capstan through the tape 21, playback head at 73 and amplifiers 81 and 84 or, depending on the position of the switch 83, the playback head at 74 and amplifiers 82 and 84.

The system so far described with reference to FIG. 1 excellently overcomes the drawbacks of prior-art equipment. In particular, the illustrated system by employing and operating a driven second capstan 14 at the location of the conventional turnabout roller, excludes the roller-tape resonance associated with turnabout roller-equipped closed loop systems. This in practice obviates a particularly bothersome resonance effect without imposing any bandwidth limiting dampening. In addition, the system shown in FIG. 1 obviates or materially reduces the type of longitudinal tape vibrations within the flutter correction spectrum associated with dual capstan drives in which the record and reproduce stations are serially disposed along a single tape span between the two capstans.

If desired, slightly different diameters may be chosen for the first and second capstans 13 and 14 to provide for an automatic tensioning of the tape 21 in the loop 61. However, a more versatile and presently preferred solution provides identical diameters for the two capstans 13 and 14 and accomplishes a selective tape tension control through the use of slightly different oscillator signals.

By way of example, the system of FIG. 1 has a second local oscillator 101 which provides a second stable reference or clock signal herein referred to as "second local oscillator signal".

The first local oscillator signal produced at 94 and the second local oscillator signal produced at 101 differ from each other by an amount $\Delta F$, as indicated at 101. By way of example, the two local oscillator signals may differ from each other in proportion to a predetermined tape tension.

As may be seen from the circuit diagram from FIG. 1, if the switches 91 and 92 are in their positions b, the driving of the tape 21 by the first capstan 13 is phase locked to the first local oscillator signal generated at 94 and also to the reference signal derived from the tape 21. Similarly, the driving of the tape by the second capstan is then phase locked to the second local oscillator signal generated at 101, in addition to the reference signal derived from the tape 21. Conversely, if the ganged switches 91 and 92 are in their positions c, the driving of the tape by the first capstan 13 is phase locked to the second local oscillator signal provided at 101 and the reference signal derived from the tape, while the driving of the tape by the capstan 14 is phase locked to the first local oscillator signal produced at 94 and to the reference signal derived from tape 21. The first and second tape drive capstans 13 and 14 are thus driven by the capstan motors 76 and 77 at different speeds, with one capstan rotating faster than the other in one of the positions b and c of the switches 91 and 92 and with the other capstan rotating faster than the one capstan in the other of the positions b and c of the ganged switches 91 and 92.

If, as indicated above, the first and second local oscillator signals differ in frequency in proportion to a predetermined tape tension, then such tape tension may be realized in the leg portion 62 of the U-shaped loop by placing the ganged switches 91 and 92 into one of their positions b and c. For instance, if recording heads are located at 91 and 92, then an optimum tape tension may be realized in the leg portion 62 during recording. Conversely, if reproduce heads are located at 73 and 74, then an optimum tape tension may be realized in the leg portion 63 during playback by actuating the ganged switches 91 and 92 to another of their positions b and c.

Such tape tension differentials between leg portions 62 and 63 may be suspended as desired by placing the switches 91 and 92 to their positions a.

Figure 2:
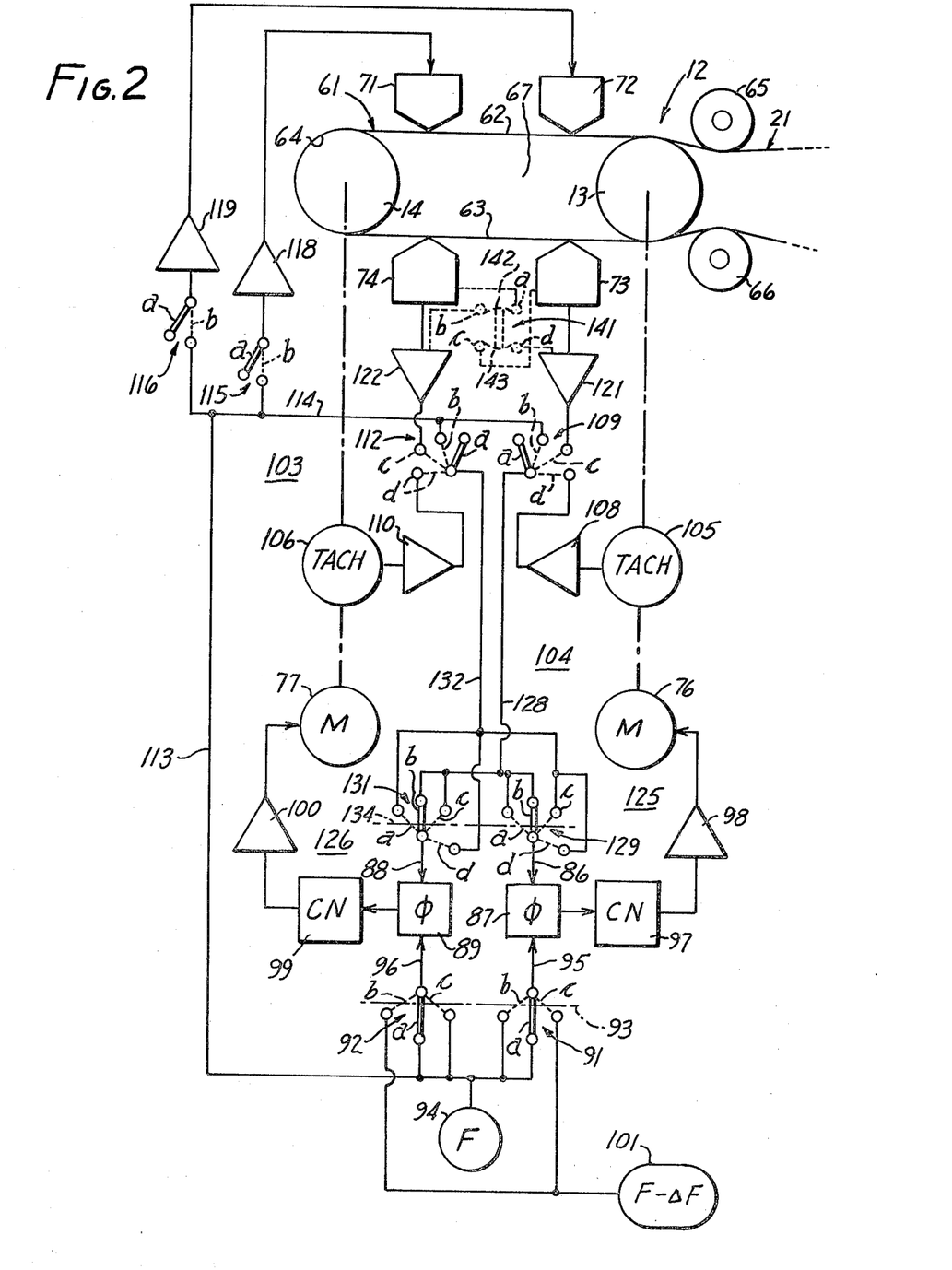
FIG. 2 is a schematic and diagrammatic showing of essential portions of a magnetic tape recording and playback system in accordance with a further preferred embodiment of the subject invention.

Even though FIG. 1 already represents a high advance over the relevant state of the art, the principles and scope of the subject invention lead to yet more versatile systems, as may be seen from FIG. 2.

In FIG. 2, the tape reels 18 and 19 and their drives and tape tension controls shown in FIG. 1 are not again illustrated but may in fact be identical or closely similar as between FIGS. 1 and 2. The remaining identical or functionally equivalent parts and components are designated by like reference numerals in FIGS. 1 and 2.

The tape recording and playback system 103 of FIG. 2 again includes the above mentioned tape transport 12 wherein the tape 21 is arranged with the first and second capstans 13 and 14 in a U-shaped tape path 61 having a pair of leg portions 62 and 63 spaced from each other by the first capstan 13 and extending to the second capstan 14 and having a bight portion 64 formed by the second capstan and interconnecting the leg portions 62 and 63.

Again, the auxiliary idlers 65 and 66 or corresponding air bearings or other tape guides, aid in the establishment of a sufficient tape traction wrap angle at the first capstan 13, by being spaced closer to each other than the diameter of capstan 13 or the space between the leg portions 62 and 63.

The first capstan drive motor 76 is again coupled to the first capstan 13 in order to rotate that first capstan for driving the tape in the closed loop 61. Similarly, the second capstan drive motor 77 is coupled to the second capstan 14 for rotating that second capstan independently of the first capstan, in order to drive the tape 21 in the closed loop 61 by the second capstan 14 independently of the first capstan 13.

As part of the servo control 104 of the equipment of FIG. 2, a first tachometer 105 is coupled to the first capstan 13 for generating a first tachometer signal. The tachometer 105 may be of a conventional design, having its rotating part attached directly to the output shaft of the first capstan drive motor 76. Similarly, a second tachometer 106 is coupled to the second capstan 14 for generating a second tachometer signal. The second tachometer 106 may be of a conventional type, having its rotating part attached directly to the output shaft of the second capstan drive motor 77.

In operation the first tachometer 105 derives a first tachometer signal from the driving of the tape with the first capstan 13 and a tachometer signal amplifier 108 amplifies such first tachometer signal and applies it to one of the poles of a multi-pole switch 109. Similarly, a second tachometer signal amplifier 110 amplifies the second tachometer signal and applies it to one pole of a second multi-pole switch 112.

During operation of the system of FIG. 2, the first and second capstans 13 and 14 advance the tape 21 in the closed loop 61 relative to or past a series of information transducers, such as multi-track recording heads engaging the tape in the leg portion 62 at 71 and 72 and corresponding playback heads engaging the tape in the leg portion 63 at 73 and 74.

In the system of FIG. 2, the first local oscillator signal is applied via lines 113 and 114 to another pole of the switch 109 and also to another pole of the switch 112.

Such first local oscillator signal is also applied to a pole of a first single-pole switch 115 and to a pole of a second single-pole switch 116. The first single-pole switch 115 has an open position a in which the reference signal recording head in the recording head stack at 71 is deactivated, and a closed position b in which the first local oscillator signal generated by the first local oscillator 94 is applied to a recording amplifier 118 and is thereupon recorded by the reference signal recording head at 71 as a first reference or clock signal in a first reference signal track on the tape 21.

Similarly, the second single-pole switch 116 has an open position a in which the reference signal recording head in the recording head stack at 72 is deactivated, and a closed position b in which the first local oscillator signal is applied to a recording amplifier 119 for recording by the reference signal recording head at 72 as a second reference signal in a second reference signal track on the tape 21.

The recorded first reference signal is derived or played back from the first reference signal recording track on the tape 21 by the reference signal playback head in the playback head stack at 73 and is applied by a playback amplifier 121 to yet another pole of the switch 109. Similarly, the recorded second reference signal is derived or played back from the second reference signal track on the tape 21 by the reference signal playback head in the playback head stack at 71 and is applied by a playback amplifier 122 to still another pole of the switch 112. In particular, the switches 109 and 112 have rest positions a in which both servo loops 125 and 126 are open, receiving no reference, local oscillator or tachometer signal.

The switch 109 further has a position b in which it applies the first local oscillator signal from the line 114 to a line 128 and thence to two poles of a switch 129 and to two different poles of a switch 131, as shown in FIG. 2. The switch 109 further has a position c in which applies the tape-derived first reference signal to the two poles of the switch 129 and to the two poles of the switch 131 that are connected to the line 128.

The switch 109 finally has a position d in which it applies the first tachometer signal to the two poles of the switch 129 and to the two poles of the switch 131 that are connected to the line 128.

Similarly, the switch 112 has a position b in which it applies the first local oscillator signal from the line 114 to a line 132 and thence to two further poles of the switch 129 and also to two further poles of the switch 131. The switch 112 also has a position c in which it applies the second tape-derived reference signal to the two poles of the switch 129 and the two poles of the switch 131 that are connected to the line 132. The switch 112 finally has a position d in which it applies the second tachometer signal to the two poles of the switch 129 and the two poles of the switch 131 that are connected to the line 132. The switch 129, in turn, has a common output connected to the first input 86 of the first phase detector 87 in the first servo loop 125. Similarly, the switch 131 has a common output connected to the first input of the second phase detector 89 in the second servo loop 126.

The equipment and circuitry shown in FIG. 2 permit several recording and playback modes within the scope of the subject invention and pursuant to various aspects thereof.

For instance, the system of FIG. 2 may be placed into a recording mode by adjusting the switches 109 and 112 to their d positions and the switches 129 and 131 to their a positions.

As indicated at 134, the switches 129 and 131 may be ganged.

In this manner, the first tachometer 105 is connected via switches 109 and 129 to the first input 86 of the first phase comparator 87, while the second tachometer 106 is connected via switches 112 and 131 to the first input 88 of the second phase comparator 89. At the same time, the ganged switches 91 and 92 may be placed into their a positions for a connection of the first local oscillator 95 to the second inputs 95 and 96 of the phase comparators 87 and 89, respectively.

In this configuration, the servo loop 125 phase locks the first capstan drive motor 76 and thus the tape drive by the first capstan 13 to the first tachometer signal and first local oscillator signal. Similarly, the second servo loop 126 phase locks the second capstan drive motor 77 and thus the driving of the tape 21 by the second capstan 14 to the second tachometer signal and to the first local oscillator signal. Expressed in equivalent language, the system of FIG. 2 in the record mode presently under consideration servoes each capstan tachometer 105 and 106 against the first local oscillator signal generated at 94. That first local oscillator signal is simultaneously recorded in either of the first and second reference signal tracks on the tape 21 by closing either of the switches 115 and 116 to its b position. It is, however, generally preferable to record the reference signal in both reference signal tracks on the tape 21 by closing both switches 115 and 116 to their b positions.

In this manner, the operator is at liberty to derive the reference signal from either reference signal track during playback of the tape 21. In principle, and within the broad contemplation of the subject invention, it would also be possible to record the second local oscillator signal as a second reference signal in either or both of the reference signal tracks on the tape 21, or to record more specifically the first local oscillator signal as a first reference signal in one of the two reference signal tracks while recording the second local oscillator signal as a second reference signal in the other of the two reference signal tracks on the tape 21. This, if desired, could easily be accomplished by providing each of the switches 115 and 116 with a third pole connected by a separate line to the output of the second local oscillator 101 and with a third position c (not shown) in which either or both of the reference signal recording heads in the recording head stacks at 71 and 72 could, as desired, be connected to the second local oscillator 101.

In practice, such an arrangement would, for instance, make sense if it were desired to derive from the tape two distinct reference signal that differ from each other in proportion to a desired tape tension, and to then utilize such different tape-derived reference signals to achieve a desired tension of the tape through the agency of a differential tape drive by the distinct capstans 13 and 14. However, the same effect for practical purposes can be accomplished using a single tape-derived reference signal or then two identical tape-derived reference signals in conjunction with different first and second local oscillator signals, as will be more fully described below.

The first local oscillator signal having been recorded in the reference signal tracks on the tape 21 as a reference signal or as two identical reference signals, to be more precise, the system of FIG. 2 may be operated in what is generally referred to in the art as "tape mode".

In this respect, the tape mode, in which one or more tape-derived reference signals are employed, is generally distinguished from the tachometer mode, in which one or more tachometer signals are utilized for phase locking the servo loops.

In a first tape mode, the switch 109 is activated to its position c, the switch 112 is left in its rest or open position a and the ganged switches 129 and 131 are set to their b positions, while the ganged switches 92 and 93 are in their solidly illustrated a positions.

In this mode, the driving of the tape by the first capstan 13 is controlled with the reference signal derived from the tape at 73, while the driving of the tape by the second capstan 14 is also controlled with the reference signal derived at 73. In this and other modes, where the same reference signal controls the two capstans 13 and 14, it may still be said that the tape 21 is driven with the second capstan 14 independently of the first capstan 13, as long as there is no slaving of either capstan to the other.

Since the reproduce head stack at 73 has a closer coupling to the first capstan 13 via a shorter tape than the reproduce head 74, it is generally advantageous to reproduce the reference signal with the reference signal playback head at 73 when information or data is being reproduced from the tape.

In the manner just described, the first and second capstans 13 and 14 are then servoed to the reference signal derived from the tape 21 at 73.

In another tape mode which, for instance, may be employed when recorded information is being reproduced by both playback head stacks at 73 and 74, the reference signals in both reference tracks on the tape may be employed for a tighter control.

For instance, the switch 112 may be advanced to its position c, and the ganged switches 129 and 139 may be set at their a positions, with the switch 109 remaining in its position c and the ganged switches 191 and 192 in their a positions.

In that mode, two different reference signals are in effect employed. As mentioned above, these reference signals may be different in frequency, such as by representing recorded versions of the first and second oscillator signals. More typically, however, the two reference signals will be different rather by being distinct from each other, such as by having been derived from the same source 94 but recorded on the tape 21 in two different reference signals recording tracks at 71 and 72 for playback at 73 and 74, respectively.

By setting the various switches as just described, the driving of the tape 12 by the capstan 13 may thus be controlled with one of the reference signals, preferably the reference signal reproduced at 73, while the driving of the tape by the second capstan is then controlled by the other reference signal, preferably the reference signal reproduced at 74.

This, in practice, provides a tight control and minimum tape span not only between the first capstan 13 and corresponding reproduce head stack 73, but also between the second capstan 14 and corresponding reproduce head stack 74.

Generally speaking, there are thus provided on the tape 21 of the recording head stacks 71 and 72 two different reference signals in two distinct reference signal tracks. These two different reference signals are derived from the tape at 73 and 74. In addition, the driving of the tape by the first capstan 13 is controlled via servo loop 125 with one of the derived reference signals, while the driving of the tape by the second capstan 14 is controlled via servo loop 126 with the other of the derived reference signals.

Further tape modes may be provided as desired by different settings of the switches 109 and 112. For instance, the servoing of either or both of the loops 125 and 126 to any tape-derived reference signal or tachometer signal may in effect be suspended by placing either or both of the switches 109 and 112 into the b position. In that case, both inputs of the affected phase comparator or comparators would receive the same first local oscillator signal.

Moreover, with the switches 109 and 112 in their c positions, the ganged switches 129 and 131 may be set to their c position for a control of the servo loop 126 with the first reference signal reproduced at 73 and a control of the servo loop 125 with the second reference signal reproduced at 74.

Finally, both capstan drives may be servoed to the second reference signal derived at 74 by placing the ganged switches 129 and 131 in their d positions, while the switch 109 is in its rest or a position and the switch 112 in its c position.

For the tape modes so far specifically described, the ganged switches 91 and 92 have also remained in their a positions. This has led to tape modes in which the tape drives are phase locked to the first local oscillator signal and to one or more derived reference signals.

In particular, in one tape mode the driving of the tape by the first capstan 13 or the first capstan drive motor 76 is phase locked to the first local oscillator signal and to either of the tape-derived reference signals, while the driving of the tape by the second capstan 14 or the second capstan drive motor 77 is phase locked to the first local oscillator signal and to either of the tape-derived reference signals.

As pointed out above, different reference signals may be provided on the tape 21, and may be separately derived from the tape, such as at 73 and 74. In that case, the driving of the tape by the first capstan 13, or the first capstan drive motor 76, may be phase locked to the first local oscillator signal and to one of the derived reference signals, while the driving of the tape by the second capstan 14, or the second capstan drive motor 77, is phase locked to the first local oscillator signal and to the other of the derived reference signals.

As indicated above, the system shown in FIG. 2 has first and second local oscillators 94 and 101 for generating different first and second local oscillator signals. There may be thus provided two reference signals differing from each other in proportion to a predetermined tape tension. The driving of the tape by the first capstan 13, or the first capstan drive motor 76, may then be controlled with one of these different reference signals, and the desired tape tension may then be realized in one of the leg portions 62 and 63 by controlling the driving of the tape by the second capstan 14, or the second capstan drive motor 77, with the other of the different reference signals. This concept, as such, is, of course, broad enough to cover also the above mentioned versions in which reference signals of different frequency would be recorded in the two reference signal tracks on the tape 21 and would then be separately reproduced at 73 and 74 for differential control of the servo loops 125 and 126.

However, in accordance with presently preferred practice, the first and second local oscillator signals are employed to differentially control the servo loops 125 and 126 in order to establish and maintain a desired tape tension in the manner described above with reference to the different positions of the ganged switches 91 and 92. Accordingly, a desired tape tension is achieved during playback in the same manner as described above for the recording mode, except that the ganged switches 91 and 92, as between their positions b and c are adjusted so that the first capstan 13 rotates slightly faster than the second capstan 14, and the desired tape tension is realized in the leg 63 at the playback head stacks 73 and 74.

This principle according to a preferred embodiment of the subject invention, leads, for instance, to a tape mode in which the driving of the tape by the first capstan 13, or the first capstan drive motor 76, is phase locked to a tape-derived reference signal and one of the local oscillator signals, while the driving of the tape by the second capstan 14, or the second capstan drive motor 77, is phase locked to a derived reference signal and to the other of the local oscillator signals. As before, the two tape-derived reference signals with which different phase locking operations are effected in the two servo loops 125 and 126 may be different from each other, such as by being distinctly recorded in two different control tracks. The system of FIG. 2 also has a tachometer mode for use during playback. In principle, that tachometer mode corresponds to the above mentioned recording mode in which the switches 109 and 112 are adjusted to their d positions and the ganged switches 129 and 131 to their a positions. In that case, the driving of the tape 21 by the first capstan 13, or in effect the first capstan drive motor 76, is controlled with the first tachometer signal derived from the tachometer 105, while the driving of the tape by the second capstan 14, or in effect the second capstan drive motor 77, is controlled with the second tachometer signal derived from the tachometer 106.

If the ganged switches 91 and 92 are then in their a positions, the driving of the tape by the first capstan 13 or the first capstan motor 76 is phase locked to the first local oscillator signal and first tachometer signal, while the driving of the tape by the second capstan 14 or the second drive motor 77 is phase locked to the first local oscillator signal and second tachometer signal.

The first and second local oscillator signals produced at 94 and 101, respectively, may also be employed in the tachometer playback mode. In that case, the driving of the tape by the first capstan 13 or the first capstan drive motor 76 is phase locked to one of the two local oscillator signals generated at 94 and 101 and to the first tachometer signal, while the driving of the tape by the second capstan 14 or the second capstan drive motor 77 is phase locked to the other of the local oscillator signals and to the second tachometer signal.

For instance, if the two local oscillator signals differ from each other in proportion to a predetermined tape tension, then such tape tension is realized as already indicated above by a setting of the ganged switches 91 and 92 so that the capstan 13 will rotate slightly faster than the capstan 14, whereby the desired tape tension for a good head-to-tape contact is realized in the leg portion 63 of the closed loop.

The system of FIG. 2 also has a tachometer mode in which one of the first and second capstans 13 and 14 is electrically slaved to the other of these first and second capstans. In particular, the first tachometer 105 and the second servo loop 126 may operate as electrical signal generating and processing means for electrically slaving the second capstan drive motor 77 to the first capstan 13. Alternatively, the second tachometer 106 and the first servo loop 125 may act as electrical signal generating and processing means for electrically slaving the first capstan drive motore 76 to the second capstan 14.

By way of example, the switch 109 may be placed in its d position, the switch 112 in its a position, and the ganged switches 129 and 131 in their b positions, for controlling the driving of the tape by the second capstan 14 or the second capstan drive motor 77 with the first tachometer signal generated at 105. At the same time, with the ganged switches 91 and 92 in their a positions, the driving of the tape by the second capstan 14 or the second capstan drive motor 77 is phase locked to the first tachometer signal and first local oscillator signal.

While the first tachometer signal controls the second capstan 14, such first tachometer signal may also control the first capstan 13. This may, for instance, by accomplished by placing the switch 109 in its d position while the switch 112 is in its a position and the ganged switches 129 and 131 are in their b positions.

Alternatively, the driving of the tape by the first capstan or the first capstan drive motor 76 may be controlled by a tape-derived reference signal, while the driving of the tape by the second capstan 14 or the second capstan drive motor 77 is slaved to the first capstan 13 via the first tachometer signal generated at 105. This may, for instsance, be accomplished by placing the switch 109 in its d position, the switch 112 in its c position and the ganged switches 129 and 131 also in their c positions.

For tighter control, it may sometimes be advantageous to phase lock the driving of the tape 21 by the first capstan 13 or the first capstan drive motor 76 to the reference signal derived from the tape 21 by the playback head closest to that capstan at 73, while slaving the driving of the tape by the second capstan 14 or the second capstan drive motor 77 to the first capstan 13 through the agency of the first tachometer signal generated at 105.

For this and similar modes of operation, it may be advantageous to provide a facility for electrically switching the outputs of the reference signal playback heads at 73 and 74 as among the c poles of the switches 109 and 112.

As indicated in dotted outline in FIG. 2, this may, for instance, be accomplished by providing a polarity reversal switch 141 which would take the place of the two solidly illustrated leads between the first reference signal playback head at 73 and the first reference signal playback amplifier 121 and between the second reference signal playback head at 74 and the second reference signal playback amplifier 122, respectively.

In the illustrated position of the movable switching contacts 142 and 143 of the rotatable polarity reversal switch 141, that switch performs the function of the solidly illustrated leads connecting the reference signal playback head at 73 to the playback amplifier at 121 and connecting the reference signal playback head at 74 to the playback amplifier at 122. The system then may operate as previously described in the tape modes.

On the other hand, if the rotatable part of the polarity reversal switch 141 is turned by 90° so that the movable switch contact 142 bridges poles a and d, while movable contact 143 bridges poles b and c, then the first reference signal playback head at 73 is connected to the second playback amplifier at 122, while the second reference signal playback head at 74 is connected to the second playback amplifier at 121.

In consequence, by setting the switch 109 in its d position, the switch 112 in its c position and the ganged switches 129 and 131 also in their c positions, the driving of the tape 21 by the first capstan 13 or the first capstan drive motor 76 may then be controlled by, or phase locked to, the first reference signal reproduced from the tape most proximately to the first capstan 13, while the driving of the tape by the second capstan 14 or by the second capstan drive motor 77 is electrically slaved to the first capstan 13 via the first tachometer signal generated at 105 and the second phase lock loop 126.

What has been said so far about electrically slaving the second capstan 14 to the first capstan 13 also applies mutatis mutandis to a slaving of the first capstan 13 to the second capstan 14. In that case, the second tachometer signal generated at 106 is applied through corresponding setting of the switch 112 and ganged switches 129 and 131 to the first servo loop 125 for a control of the driving of the tape by the first capstan 13 or the first capstan drive motor 76 with the second tachometer signal. At the same time, the driving of the tape by the second capstan 14 or the second capstan drive motor 77 can also be controlled by the second tachometer signal or, by a corresponding setting of the switches 109 and 112, by a reference signal derived from the tape 21.

In all these electrical capstan slaving modes, the driving of the tape by the first and/or second capstan may be phase locked with the aid of the first and/or second local oscillator signal.

For instance, if the driving of the tape by the second capstan 14 is phase locked to the first tachometer signal and first local oscillator signal, then the driving of the tape by the first capstan 13 may be phase locked to a tape-derived reference signal and the first local oscillator signal.

By way of further example, if the driving of the tape by the second capstan 14 is phase locked to the first tachometer signal and first local oscillator signal, then the driving of the tape by the first capstan 13 may be phase locked to a tape-derived reference signal and to the second local oscillator signal, such as for the purpose of achieving a desired tape tension.

This phase locking may, of course, be reversed as between the capstans 13 and 14, so as to accomplish a desired tape tension in the other of the two tape path legs 62 and 63.

Practical tests have verified that the systems of the subject invention yield unprecedented servo bandwidths from as low as the direct-current level to as high as the one kilo Hertz area. Since the slaving of the capstans in the capstan slaving mode proceeds electrically, there are no speed fluctuations from elastic belt drives or bandwidth-limiting self-resonance effects from stiff coupling belts as in the above mentioned prior-art system which couples one capstan to the other by a belt transmission. Yet the low frequency gain of the illustrated phase lock servo systems is so great that an effective coupling stiffness far greater than any feasible belt drive can be achieved at a much more precise velocity correlation. This also minimizes the possibility of relative movement of the turnaround capstan 14 in response to tape/capstan inertia resonance.

By operating the system in one of the above mentioned modes with the aid of reference signals derived from two reference tracks, with each capstan being servoed against the reference signal reproduced by the playback head located closest to that capstan, the very low time base errors being thus corrected are associated with correspondingly minute displacements of the tape element from nominal, so that the compliance of the tape span will easily accommodate the resulting differential displacement.

Also, in contrast to mechanical solutions, optimally damped, stable systems of wide mechanical bandwidths and extremely low phase error between reference and load may be achieved electronically in the compensating networks 97 and 99 and amplifiers 98 and 100, as is, for instance, customary in the phase lock servo art with loop filters and associated components.

As a further advantage, the tape transport according to the illustrated preferred embodiment of the invention operates without any pinch rollers and thereby avoids their above mentioned deleterious effects. A far-reaching isolation of the reeling systems 18 and 19 from the metering station or closed loop 61 is achieved at 25, 26, 45 and 46. Further isolation may be accomplished by the use of vacuum columns at 26 and 46.

In addition, the subject extensive disclosure will suggest and render apparent to those skilled in the art various modifications and variations within the spirit and scope of the subject invention

We claim:

1. In a method of driving an information carrier tape with spaced distinct first and second capstans relative to information transducing means situated at the space between said capstans, the improvement comprising in combination the steps of:
   arranging said tape with said capstans in a U-shaped tape path having a pair of leg portions spaced from each other by said first capstan and extending to said second capstan and having a bight portion formed by said second capstan and interconnecting said leg portions;
   driving said tape with said first capstan; and
   driving said tape with said second capstan independently of said first capstan.

2. A method as claimed in claim 1, including the steps of:
   providing a reference signal;
   controlling the driving of said tape by said first capstan with said reference signal; and
   controlling the driving of said tape by said second capstan with said reference signal.

3. A method as claimed in claim 1, including the steps of:
   providing two different reference signals;
   controlling the driving of said tape by said first capstan with one of said reference signals; and
   controlling the driving of said tape by said second capstan with the other of said reference signals.

4. A method as claimed in claim 1, including the steps of:
   providing two reference signals differing from each other in proportion to a predetermined tape tension;
   controlling the driving of said tape by said first capstan with one of said reference signals; and
   realizing said tape tension in one of said leg portions by controlling the driving of said tape by second capstan with the other of said reference signals.

5. A method as claimed in claim 1, including the steps of:
   providing obn said tape a reference signal;
   deriving said reference signal from said tape;
   controlling the driving of said tape by said first capstan with said derived reference signal; and
   controlling the driving of said tape by said second capstan with said derived reference signal.

6. A method as claimed in claim 1, including the steps of:
   providing on said tape two different reference signals;
   deriving said two different reference signals from said tape;
   controlling the driving of said tape by said first capstan with one of said derived reference signals; and
   controlling the driving of said tape by said second capstan with the other of said derived reference signals.

7. A method as claimed in claim 1, including the steps of:
   deriving a first tachometer signal from the driving of the tape with said first capstan;
   controlling the driving of said tape by said first capstan with said first tachometer signal;
   deriving a second tachometer signal from the driving of the tape with said second capstan; and
   controlling the driving of said tape by said second capstan with said second tachometer signal.

8. A method as claimed in claim 1, including the steps of:
   providing a local oscillator signal;
   deriving a first tachometer signal from the driving of said tape with said first capstan;
   phase locking the driving of said tape by said first capstan to said local oscillator signal and first tachometer signal;
   deriving a second tachometer signal from the driving of said tape with said second capstan; and
   phase locking the driving of said tape by said second capstan to said local oscillator signal and second tachometer signal.

9. A method as claimed in claim 1, including the steps of:
   providing two different local oscillator signals;
   deriving a first tachometer signal from the driving of said tape with said first capstan;
   phase locking the driving of said tape by said first capstan to one of said local oscillator signals and said first tachometer signal;
   deriving a second tachometer signal from the driving of said tape with said second capstan; and
   phase locking the driving of said tape by said second capstan to the other of said local oscillator signals and said second tachometer signal.

10. A method as claimed in claim 1, including the steps of:
    providing two local oscillator signals differing from each other in proportion to a predetermined tape tension;
    deriving a first tachometer signal from the driving of said tape with said first capstan;
    phase locking the driving of said tape by said first capstan to one of said local oscillator signals and said first tachometer signal;
    deriving a second tachometer signal from the driving of said tape with said second capstan; and
    realizing said tape tension in one of said leg portions by phase locking the driving of said tape by said second capstan to the other of said local oscillator signals and said second tachometer signal.

11. A method as claimed in claim 1, including the steps of:
providing on said tape a reference signal;
deriving said reference signal from said tape;
providing a local oscillator signal;
phase locking the driving of said tape by said first capstan to said local oscillator signal and derived reference signal; and
phase locking the driving of said tape by said second capstan to said local oscillator signal and derived reference signal.

12. A method as claimed in claim 1, including the steps of:
providing on said tape a reference signal;
deriving said reference signal from said tape;
providing two different local oscillator signals;
phase locking the driving of said tape by said first capstan to said derived reference signal and one of said local oscillator signals; and
phase locking the driving of said tape by said second capstan to said derived reference signal and the other of said local oscillator signals.

13. A method as claimed in claim 1, including the steps of:
providing on said tape a reference signal;
deriving said reference signal from said tape;
providing two local oscillator signals differing from each other in proportion to a predetermined tape tension;
phase locking the driving of said tape by said first capstan to said derived reference signal and one of said local oscillator signals; and
realizing said tape tension in one of said leg portions by phase locking the driving of said tape by said second capstan to said derived reference signal and the other of said local oscillator signals.

14. A method as claimed in claim 1, including the steps of:
providing on said tape two different reference signals;
deriving said two different reference signals from said tape;
providing a local oscillator signal;
phase locking the driving of said tape by said first capstan to said local oscillator signal and one of said derived reference signals; and
phase locking the driving of said tape by said second capstan to said local oscillator signal and the other of said derived reference signals.

15. A method as claimed in claim 1, including the steps of:
providing on said tape two different reference signals;
deriving said two different reference signals from said tape;
providing two different local oscillator signals;
phase locking the driving of said tape by said first capstan to one of said derived reference signals and one of said local oscillator signals; and
phase locking the driving of said tape by said second capstan to the other of said derived reference signals and the other of said local oscillator signals.

16. A method as claimed in claim 1, including the steps of:
providing on said tape two different reference signals;
deriving said two different reference signals from said tape;
providing two local oscillator signals differing from each other in proportion to a predetermined tape tension;
phase locking the driving of said tape by said first capstan to one of said derived reference signals and one of said local oscillator signals; and
realizing said tape tension in one of said leg portions by phase locking the driving of said tape by said second capstan to the other of said derived reference signals and the other of said local oscillator signals.

17. In a method of driving an information carrier tape with spaced distinct first and second capstans relative to information transducing means situated at the space between said capstans, the improvement comprising in combination the steps of:
arranging said tape with said capstans in a U-shaped tape path having a pair of leg portions spaced from each other by said first capstan and extending to said second capstan and having a bight portion formed by said second capstan and interconnecting said leg portions;
driving said tape with said first capstan;
driving said tape with said second capstan; and
electrically slaving the driving of one of said first and second capstans to the other of said first and second capstans.

18. A method as claimed in claim 17, wherein said electrical slaving includes the steps of:
deriving a tachometer signal from the driving of said tape with said other capstan; and
controlling the driving of said tape by said one capstan with said tachometer signal.

19. A method as claimed in claim 17, wherein said electrical slaving includes the steps of:
providing a local oscillator signal;
deriving a tachometer signal from the driving of said tape with said other capstan; and
phase locking the driving of said tape by said one capstan to said tachometer signal and local oscillator signal.

20. A method as claimed in claim 17, 18 or 19, including the steps of:
providing on said tape a reference signal,
deriving said reference signal from said tape; and
controlling the driving of said tape by said other capstan with said derived reference signal.

21. A method as claimed in claim 17, wherein:
said electrical slaving includes the steps of providing a local oscillator signal, deriving a tachometer signal from the driving of said tape with said other capstan, and phase locking the driving of the tape by said one capstan to said tachometer signal and local oscillator signal; and
said method further includes the steps of providing on said tape a reference signal, deriving said reference signal from said tape, and phase locking the driving of said tape by said other capstan to said derived reference signal and said local oscillator signal.

22. A method as claimed in claim 17, wherein:
said electrical slaving includes the steps of providing a first local oscillator signal, deriving a tachometer signal from the driving of said tape with said other capstan, and phase locking the driving of the tape by said one capstan to said tachometer signal and first local oscillator signal; and
said method further includes the steps of providing on said tape a reference signal, deriving said reference signal from said tape, providing a second local oscillator signal, and phase locking the driving of said tape by said other capstan to said derived reference signal and said second local oscillator signal.

23. In apparatus for driving an information carrier tape, the improvement comprising in combination:
means for arranging said tape in a U-shaped tape path, including a first capstan located between two leg portions of said tape path, and a second capstan spaced from said first capstan and forming a bight portion for said tape path interconnecting said leg portions;
means coupled to said first capstan for driving said tape with said first capstan; and
means coupled to said second capstan for driving said tape with said second capstan independently of said first capstan.

24. Apparatus as claimed in claim 23, including:
means for providing a reference signal;
means connected to said first capstan driving means for controlling said first capstan driving means with said reference signal; and
means connected to said second capstan driving means for controlling said second capstan driving means with said reference signal.

25. Apparatus as claimed in claim 23, including:
means for providing two different reference signals;
means connected to said first capstan driving means for controlling said first capstan driving means with one of said reference signals; and
means connected to said second capstan driving means for controlling said second capstan driving means with the other of said reference signals.

26. Apparatus as claimed in claim 23, including:
means for providing two reference signals differing from each other in proportion to a predetermined tape tension;
means connected to said first capstan driving means for controlling said first capstan driving means with one of said reference signals; and
means connected to said second capstan driving means for providing said tape tension in one of said leg portions, including means for controlling said second capstan driving means with the other of said reference signals.

27. Apparatus as claimed in claim 23, including:
means for providing on said tape a reference signal;
means for deriving said reference signal from said tape;
means connected to said deriving means and said first capstan driving means for controlling said first capstan driving means with said derived reference signal; and
means connected to said deriving means and said second capstan driving means for controlling said second capstan driving means with said derived reference signal.

28. Apparatus as claimed in claim 23, including:
means for providing on said tape two different reference signals;
means for deriving said two different reference signals from said tape;
means connected to said deriving means and said first capstan driving means for controlling said first capstan driving means with one of said derived reference signals; and
means connected to said deriving means and said second capstan driving means for controlling said second capstan driving means with the other of said derived reference signals.

29. Apparatus as claimed in claim 23, including:
a first tachometer coupled to said first capstan for generating a first tachometer signal;
means connected to said first tachometer and said first capstan driving means for controlling said first capstan driving means with said first tachometer signal;
a second tachometer coupled to said second capstan for generating a second tachometer signal; and
means connected to said second tachometer and said second capstan driving means for controlling said second capstan driving means with said second tachometer signal.

30. Apparatus as claimed in claim 23, including:
means for providing a local oscillator signal;
a first tachometer coupled to said first capstan for generating a first tachometer signal;
means connected to said local oscillator signal providing means, to said first tachometer and to said first capstan driving means for phase locking said first capstan driving means to said local oscillator signal and first tachometer signal;
a second tachometer coupled to said second capstan for generating a second tachometer signal; and
means connected to said local oscillator signal providing means, to said second tachometer, and to said second capstan driving means for phase locking said second capstan driving means to said local oscillator signal and second tachometer signal.

31. Apparatus as claimed in claim 23, including:
means for providing two different local oscillator signals;
a first tachometer coupled to said first capstan for generating a first tachometer signal;
means connected to said local oscillator signal providing means, to said first tachometer and to said first capstan driving means for phase locking said first capstan driving means to one of said local oscillator signals and said first tachometer signal;
a second tachometer coupled to said second capstan for generating a second tachometer signal; and
means connected to said local oscillator signal providing means, to said second tachometer, and to said second capstan driving means for phase locking said second capstan driving means to the other of said local oscillator signals and said second tachometer signal.

32. Apparatus as claimed in claim 23, including:
means for providing two local oscillator signals differing from each other in proportion to a predetermined tape tension;
a first tachometer coupled to said first capstan for generating a first tachometer signal;
means connected to said local oscillator signal providing means, to said first tachometer and to said first capstan driving means for phase locking said first capstan driving means to one of said local oscillator signals and said first tachometer signal;
a second tachometer coupled to said second capstan for generating a second tachometer signal; and
means for providing said tape tension in one of said leg portions, including means connected to said local oscillator signal providing means, to said second tachometer, and to said second capstan driving means for phase locking said second capstan driving means to the other of said local oscillator signals and said second tachometer signal.

33. Apparatus as claimed in claim 23, including:

means for providing on said tape a reference signal;

means for deriving said reference signal from said tape;

means for providing a local oscillator signal;

means connected to said local oscillator signal providing means, to said reference signal deriving means, and to said first capstan driving means for phase locking said first capstan driving means to said local oscillator signal and derived reference signal; and means connected to said local oscillator signal providing means, to said reference signal deriving means, and to said second capstan driving means for phase locking said second capstan driving means to said local oscillator signal and derived reference signal.

34. Apparatus as claimed in claim 23, including:

means for providing on said tape a reference signal;

means for deriving said reference signal from said tape;

means for providing two different local oscillator signals;

means connected to said local oscillator signal providing means, to said reference signal deriving means, and to said first capstan driving means for phase locking said first capstan driving means to said derived reference signal and one of said local oscillator signals; and means connected to said local oscillator signal providing means, to said reference signal deriving means, and to said second capstan driving means for phase locking said second capstan driving means to said derived reference signal and the other of said local oscillator signals.

35. Apparatus as claimed in claim 23, including:

means for providing on said tape a reference signal;

means for deriving said reference signal from said tape;

means for providing two local oscillator signals differing from each other in proportion to a predetermined tape tension;

means connected to said local oscillator signal providing means, to said reference signal deriving means, and to said first capstan driving means for phase locking said first capstan driving means to said derived reference signal and one of said local oscillator signals; and means for providing said tape tension in one of said leg portions, including means connected to said local oscillator signal providing means, to said reference signal deriving means, and to said second capstan driving means for phase locking said second capstan driving means to said derived reference signal and the other of said local oscillator signals.

36. Apparatus as claimed in claim 23, including:

means for providing on said tape two different reference signals;

means for deriving said two different reference signals from said tape;

means for providing a local oscillator signal;

means connected to said local oscillator signal providing means, to said reference signal deriving means, and to said first capstan driving means for phase locking said first capstan driving means to said local oscillator signal and one of said derived reference signals; and means connected to said local oscillator signal providing means, to said reference signal deriving means, and to said second capstan driving means for phase locking said second capstan driving means to said local oscillator signal and the other of said derived reference signals.

37. Apparatus as claimed in claim 23, including:

means for providing on said tape two different reference signals;

means for deriving said two different reference signals from said tape;

means for providing two different local oscillator signals;

means connected to said local oscillator signal providing means, to said reference signal deriving means, and to said first capstan driving means for phase locking said first capstan driving means to one of said derived reference signals and one of said local oscillator signals; and means connected to said local oscillator signal providing means, to said reference signal deriving means, and to said second capstan driving means for phase locking said second capstan driving means to the other of said derived reference signals and the other of said local oscillator signals.

38. Apparatus as claimed in claim 23, including:

means for providing on said tape two different reference signals;

means for deriving said two different reference signals from said tape;

means for providing two local oscillator signals differing from each other in proportion to a predetermined tape tension;

means connected to said local oscillator signal providing means, to said reference signal deriving means, and to said first capstan driving means for phase locking said first capstan driving means to one of said derived reference signals and one of said local oscillator signals; and means for providing said tape tension in one of said leg portions, including means connected to said local oscillator signal providing means, to said reference signal deriving means, and to said second capstan driving means for phase locking said second capstan driving means to the other of said derived reference signals and the other of said local oscillator signals.

39. In apparatus for driving an information carrier tape, the improvement comprising in combination:

means for arranging said tape in a U-shaped tape path, including a first capstan located between two leg portions of said tape path, and a second capstan spaced from said first capstan and forming a bight portion for said tape path interconnecting said leg portions;

means coupled to said first capstan for driving said tape with said first capstan;

means coupled to said second capstan for driving said tape with said second capstan; and electrical signal generating and processing means connected to the means for driving one of said first and second capstans and coupled to the other of said first and second capstans for electrically slaving the means for driving said one capstan to said other capstan.

40. Apparatus as claimed in claim 39, wherein said electrical slaving means include:
- a tachometer coupled to said other capstan for generating a tachometer signal; and
- means connected to the driving means of said one capstan for controlling said one capstan with said tachometer signal.

41. Apparatus as claimed in claim 39, wherein said electrical slaving means include:
- means for providing a local oscillator signal;
- a tachometer coupled to said other capstan for generating a tachometer signal; and
- means connected to the means for driving said one capstan, to said local oscillator signal providing means, and to said tachometer for phase locking the means for driving said one capstan to said tachometer signal and local oscillator signal.

42. Apparatus as claimed in claim 39, 40 or 41, including:
- means for providing on said tape a reference signal;
- means for deriving said reference signal from said tape; and
- means connected to said reference signal deriving means and to the means for driving said other capstan for controlling the driving of said tape by said other capstan with said derived reference signal.

43. Apparatus as claimed in claim 39, wherein:
- said electrical slaving means include means for providing a local oscillator signal, a tachometer coupled to said other capstan for generating a tachometer signal, and means for phase locking the means for driving said one capstan to said tachometer signal and local oscillator signal; and
- said apparatus further includes means for providing on said tape a reference signal, means for deriving said reference signal from said tape, and means connected to said deriving means, to said local oscillator providing means, and to the means for driving said other capstan, for phase locking the means for driving said other capstan to said derived reference signal and said local oscillator signal.

44. Apparatus as claimed in claim 39, wherein:
- said electrical slaving means include means for providing a first local oscillator signal, a tachometer coupled to said other capstan for generating a tachometer signal, and means for phase locking the means for driving said one capstan to said tachometer signal and first local oscillator signal; and
- said apparatus further includes means for providing on said tape a reference signal, means for deriving said reference signal from said tape, means for providing a second oscillator signal, and means connected to said deriving means, to said local oscillator providing means and to the means for driving said other capstan, for phase locking the means for driving said other capstan to said derived reference signal and said second local oscillator signal.

* * * * *